United States Patent [19]
Williamson et al.

[11] 3,985,305
[45] Oct. 12, 1976

[54] SILAGE UNLOADER
[75] Inventors: Gerald E. Williamson, Ankeny; Wayne Dickey, Runnells; Ross D. Koberlein, Ankeny, all of Iowa
[73] Assignee: Koehring Company, Milwaukee, Wis.
[22] Filed: May 7, 1975
[21] Appl. No.: 575,251

[52] U.S. Cl. .......................... 241/101.7; 198/722; 299/76; 241/277; 198/640; 198/611
[51] Int. Cl.² ........................................ B02C 18/06
[58] Field of Search .................... 241/101.7, 277; 198/7 R, 9, 36; 299/76

[56] References Cited
UNITED STATES PATENTS

| 1,903,672 | 4/1933 | Hauge | 198/7 |
| 3,472,298 | 10/1969 | Vinogradov et al. | 299/76 X |
| 3,779,408 | 12/1973 | Ivie | 241/101.7 X |
| 3,847,266 | 11/1974 | Cox | 198/36 |
| 3,867,772 | 2/1975 | Smith | 241/101.7 |

Primary Examiner—Granville Y. Custer, Jr.
Assistant Examiner—Howard N. Goldberg
Attorney, Agent, or Firm—Zarley, McKee, Thomte & Voorhees

[57] ABSTRACT

A silage unloader is disclosed for use in cutting silage from silage stored in a silage trench or the like. The unloader comprises a frame means which is adapted to be connected to the three-point hitch of a tractor or the like. A vertically disposed boom means is secured to the frame and extends upwardly therefrom and comprises telescopically mounted boom members. A reel boom is secured to the boom means and extends therefrom and has a silage cutting reel means rotatably mounted on the outer end thereof about a horizontal axis. A double acting hydraulic cylinder is provided within the boom means for raising and lowering the boom means, reel boom and reel. An auger conveyor means is provided on the frame means below the reel means so that the cut silage will be gathered thereby and conveyed to a blower means for blowing the silage to a feed wagon, truck or the like. The boom means, reel and conveyor are hydraulically powered while the blower means is powered by the tractor PTO. Means is also so provided for supporting the hydraulic hoses which are connected to the hydraulic motor for powering the cutting reel.

11 Claims, 11 Drawing Figures

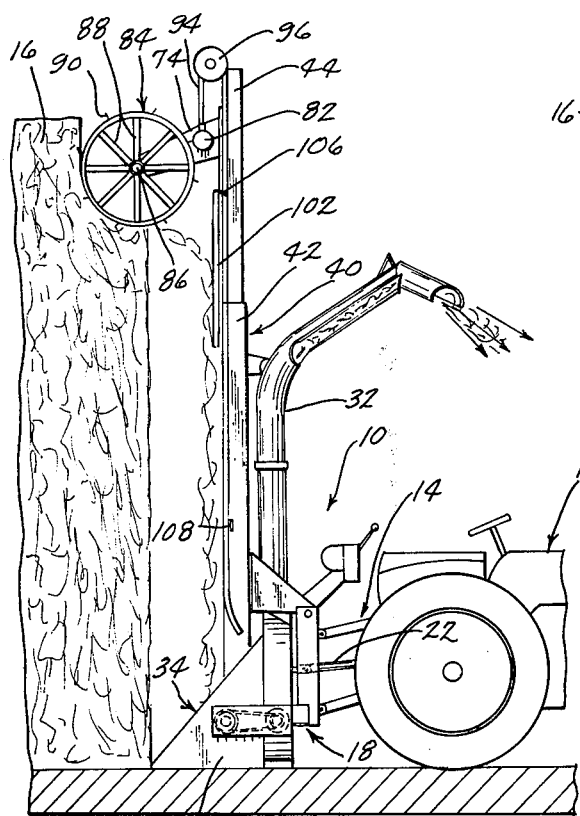
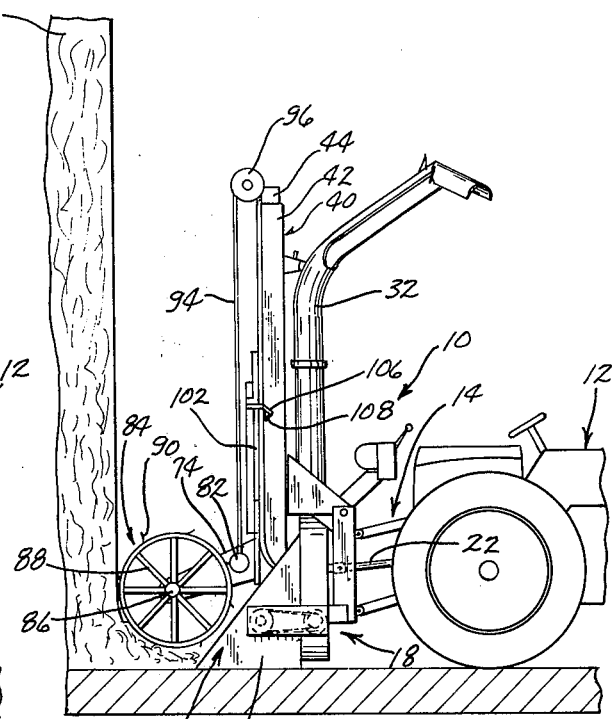
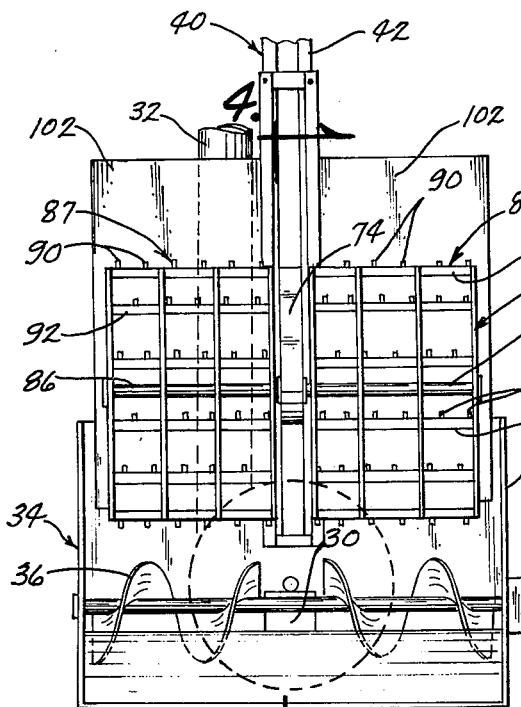
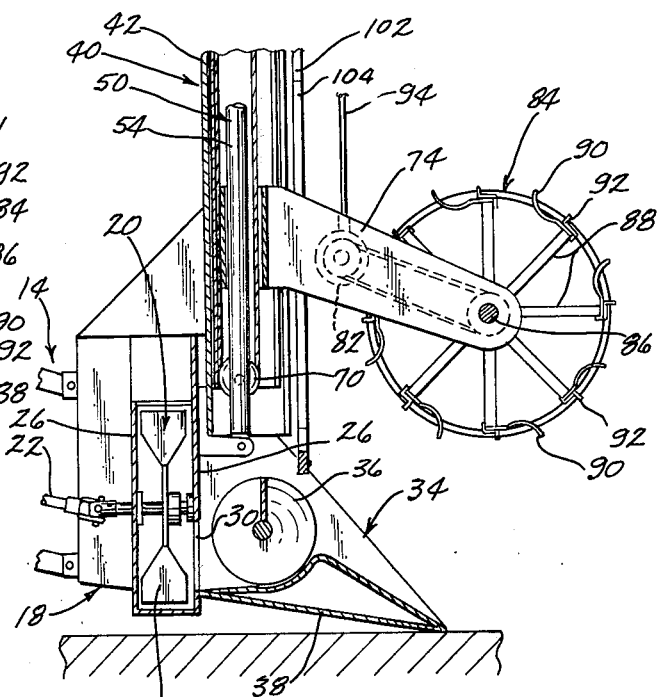

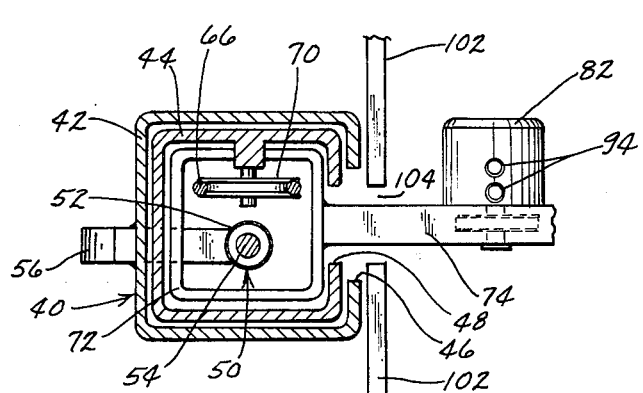
Fig. 6
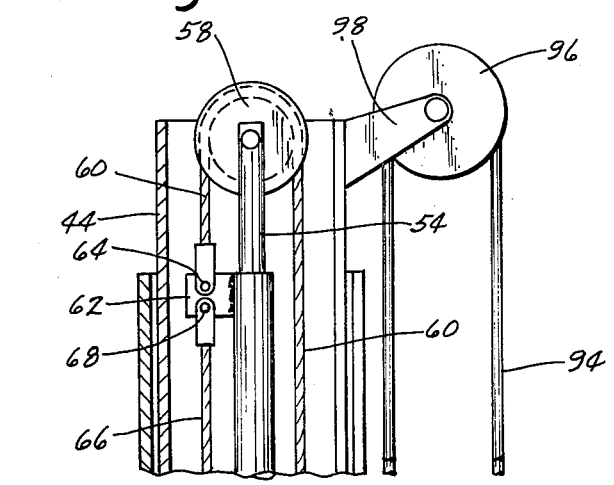
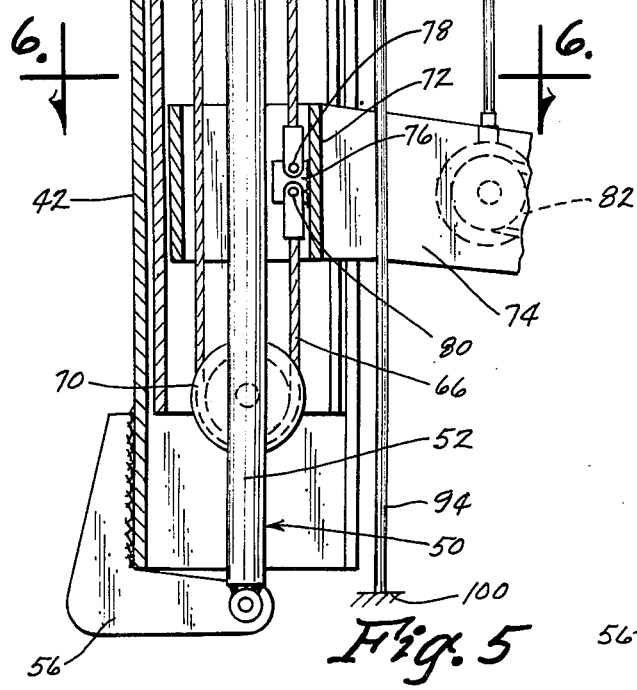
Fig. 5
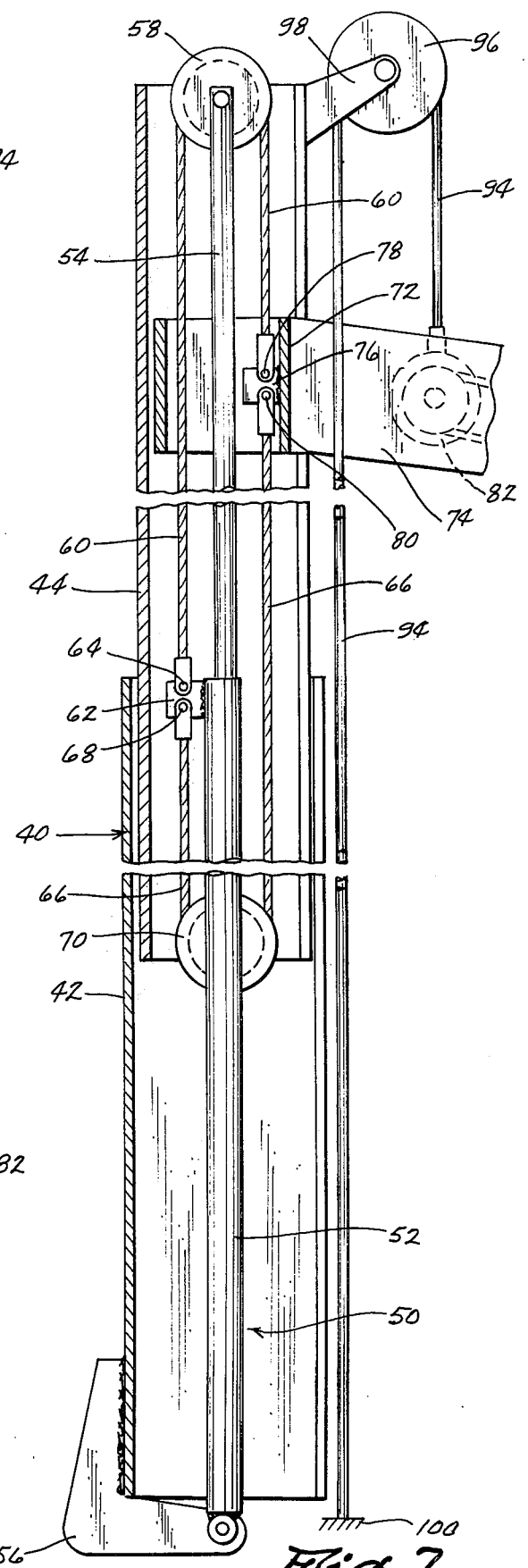
Fig. 7

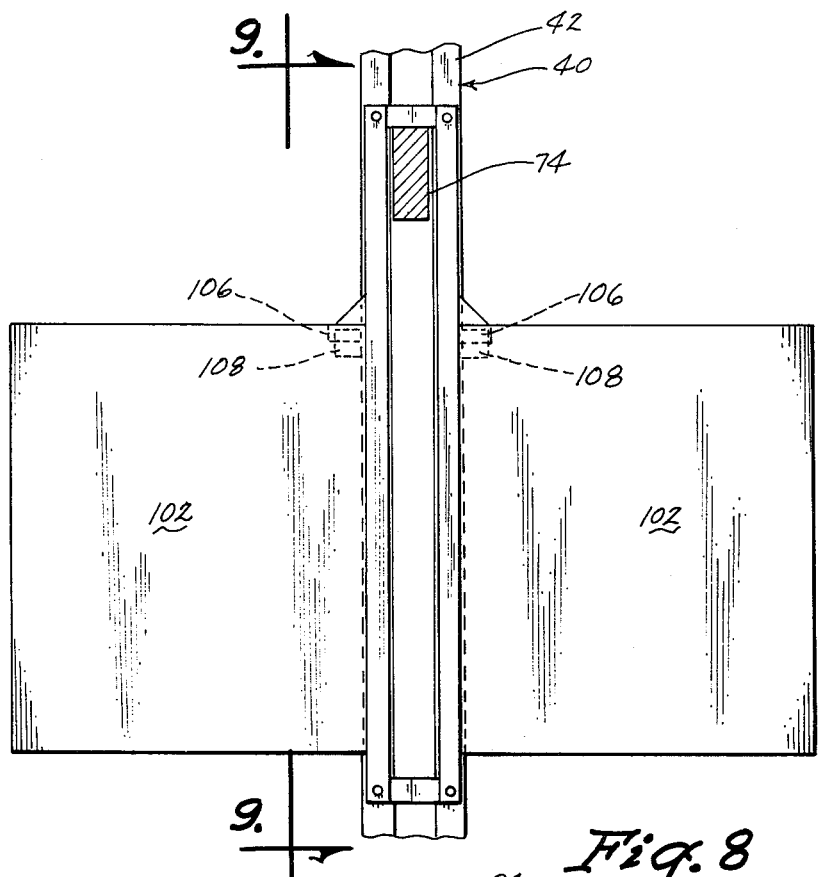
Fig. 8
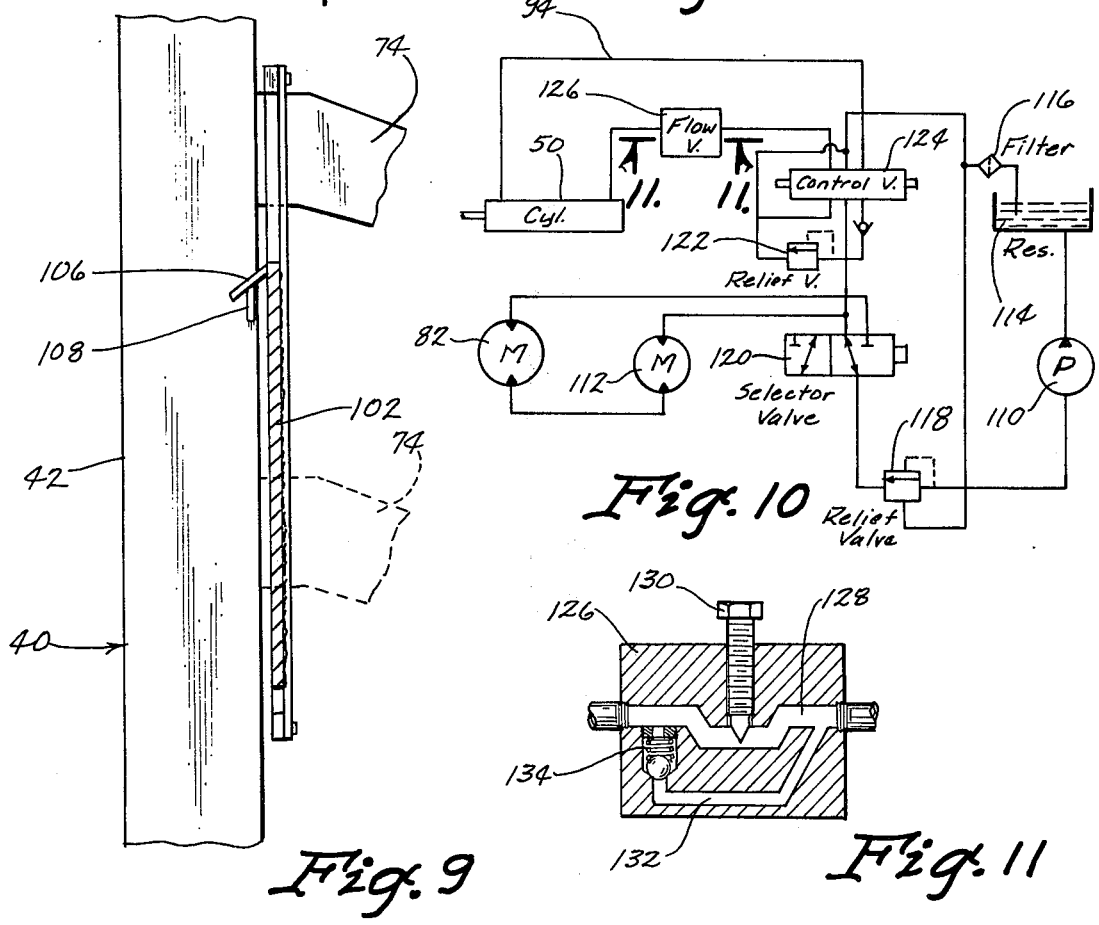
Fig. 9
Fig. 10
Fig. 11

SILAGE UNLOADER

BACKGROUND OF THE INVENTION

Silage is commonly stored in silage trenches or the like. When it is desired to remove the silage from the trench, the compaction of the silage and the frequently frozen silage make such removal extremely difficult.

Several silage loading devices have been previously provided but are inefficient in operation, expensive to manufacture and difficult to maintain. The biggest single drawback in the prior art devices is that the cutting reels thereon do not attack or engage the silage in a vertical manner with power exerted in a downward direction on the cutting reel. The prior art devices often cut arcuate forward faces in the silage which frequently collapse and are therefore dangerous to the loader operator. Additionally, the conventional devices do not have means thereon for applying sufficient downward force to the cutting reel so as to cause the cutting reel to effectively engage the compacted silage.

Therefore, it is a principal object of the invention to provide an improved silage unloader.

A further object of the invention is to provide a silage unloader including means for raising and lowering a cutting reel in a vertical manner relative to the silage, with the lowering of the reel being at a controlled speed, and with down pressure being applied to the reel.

A further object of the invention is to provide a silage unloader including a novel telescopically movable boom means.

A further object of the invention is to provide a silage unloader including means for applying upward and downward vertical force to a cutting reel mounted thereon.

A further object of the invention it to provide a silage unloader of relatively short longitudinal length to facilitate the turning thereof.

A further object of the invention is to provide a silage unloader including means for supporting the hydraulic hoses connected to the hydraulic motor which powers the cutting reel, whereby no hose take-up reel is required.

A further object of the invention is to provide a silage unloader which is economical of manufacture, durable in use and refined in appearance.

These and other objects will be apparent to those skilled in the art.

BRIEF DESCRIPTION OF THE DRAWINGS

This invention consists in the construction, arrangements and combination of the various parts of the device, whereby the objects contemplated are attained as hereinafter more fully set forth, specifically pointed out in the claims, and illustrated in the accompanying drawings, in which:

FIG. 1 is a side view of the unloader of this invention illustrating the cutting reel in a raised position.

FIG. 2 is a view similar to FIG. 1 except that the cutting reel has been lowered from the position of FIG. 1;

FIG. 3 is a fragmentary front view of the loader;

FIG. 4 is a sectional view seen on lines 4—4 of FIG. 3.

FIG. 5 is a partial longitudinal sectional view of the telescopic boom means employed on the unloader;

FIG. 6 is a sectional view seen on lines 6—6 of FIG. 5;

FIG. 7 is a sectional view similar to FIG. 5 except that the boom means is shown in an extended position;

FIG. 8 is a partial elevational view of the shield member similar to that of FIG. 3;

FIG. 9 is a sectional view of the shield member taken on line 9—9 of FIG. 8;

FIG. 10 is a schematic drawing of the hydraulic circuitry; and

FIG. 11 is a sectional view of a restricter flow valve taken on line 11—11 of FIG. 10.

DESCRIPTION OF THE PREFERRED EMBODIMENT

The numeral 10 refers generally to the loader device of this invention while the numeral 12 refers to a conventional tractor having a three-point hitch 14 provided at the rearward end thereof. The numeral 16 generally refers to silage material which would normally be stored in a silage trench or the like.

Loader 10 generally comprises a frame means 18 which is adapted to be secured to the hitch 14 of the tractor to permit the tractor to raise and lower the same in conventional fashion. A fan or blower means 20 is provided on the frame means 18 as illustrated in the drawings and is driven by the tractor PTO 22. Fan 24 is mounted in a housing or shroud 26 having an opening 30 provided in the lower forward end thereof. Shroud 26 is in communication with a spout 32 extending therefrom to permit the silage to be blown into a feed wagon, truck or the like as will be described in more detail hereinafter.

A conveyor auger means 34 is provided at the rearward end of the frame means 18 generally comprising an auger 36 rotatably mounted in a hopper 38. Auger 36 is adapted to gather the cut silage and to convey the same to the opening 30 in the housing 26.

A boom means generally referred to by the reference numeral 40 is mounted on the frame means 18 and extends vertically upwardly therefrom as illustrated in the drawings. Boom means 40 comprises boom member 42 which is rigidly mounted at its lower end to the frame means 18. Boom member 44 is vertically movably received within the boom member 42 as illustrated in FIGS. 5, 6 and 7. Boom members 42 and 44 are provided with vertically disposed elongated openings 46 and 48 formed in the forward sides thereof respectively. Hydraulic cylinder 50 is positioned within boom member 44 and generally comprises a body portion 52 having a rod 54 slidably extending therefrom. The lower end of body portion 52 is secured to the lower end of boom member 42 by means of bracket or plate 56 as illustrated in FIGS. 5 and 7. Pulley 58 is rotatably secured, about a horizontal axis, to the upper end of rod 54 and is adapted to have the cable 60 extending thereover. One end of cable 60 is secured to the bracket 62 at 64. As seen in FIG. 5, bracket 62 is secured to the body portion 52 of cylinder 50 at the upper end thereof by welding or the like. One end of cable 66 is secured to the bracket 62 at 68 and extends downwardly therefrom. Cable 66 extends around pulley 70 which is rotatably secured to, about a horizontal axis, the lower end of boom member 44.

A tubular box-like reel support 72 is vertically movably mounted within boom member 44 and has a reel boom 74 secured thereto by welding or the like which extends outwardly through the openings 48 and 46 formed in boom members 44 and 42 respectively. Cable 60 is secured to bracket 76 at 78. Cable 66 is secured to bracket 76 at 80. Bracket 76 is secured to the support 72 by any convenient means such as by welding or the like as illustrated in FIGS. 5 and 7.

A hydraulic motor 82 is mounted on the reel boom 74 and is adapted to rotate or drive the silage cutting reel means 84 which is rotatably supported on the outer end of reel boom 74. Reel means 84 generally comprises an axle 86 having a pair of reels 87 and 87' mounted thereon. Each of the reels 87 and 87' includes a plurality of spokes 88 secured to the axle 86 and extending radially outwardly therefrom. A plurality of tines 90 are mounted on the tine supports 92 which are secured to the spokes 88. The numeral 94 refers to a hydraulic hose which is operatively connected to the hydraulic motor 82 for powering the same. Hydraulic hose 94 extends upwardly from the motor 82 and extends around a hose reel 96 which is rotatably mounted on the upper end of the boom member 44 by means of arm 98. Hose 94 is connected at its other end to a suitable connection on the loader generally referred to by the reference numeral 100. Hose 94 is of fixed length and the means for mounting the same eliminates the need for elaborate and costly connections, etc., or for any means to take up slack in the hose.

Shield 102 is provided with a vertically disposed slot 104 formed therein. As seen in the drawings, the upper end of the slot 104 terminates in a spaced relationship with respect to the upper edge of the shield. Reel boom 74 extends outwardly through slot 104. Plates 106 are secured to the upper forward edge of the shield 102 and extend forwardly and downwardly therefrom. Plates 108 are secured to the sides of boom 42 in the movable path of plate 106. In the position of FIG. 1, the shield 102 hangs on the reel boom 74 with the reel boom 74 being positioned in the upper end of the slot 104. Shield 102 moves downwardly with reel boom 74 until the plates 106 engage plates 108 to limit further downward movement of the shield 102. Continued downward movement of the reel boom 74 is permitted since the reel boom simply moves downwardly in the slot 104 independently of the shield.

With reference to FIG. 10, hydraulic pump 110 is hydraulically connected to cylinder 50, reel motor 82 and auger motor 112 through suitable hydraulic connections including hose 94. Conventional hydraulic components are imposed within this hydraulic circuit, and reference is made to reservoir 114, filter 116, relief valve 118, selector valve 120, relief valve 122, and control valve 124. Flow valve 126 (FIG. 11) has its main passageway 128 adjustably restricted by threaded valve element 130. A bypass passageway 132 with check valve 134 permits unrestricted flow through passageway 132 in a lefthand direction as viewed in FIG. 11, but prevents flow therethrough in an opposite direction, thus causing all flow therethrough to move to the right through the restricted passageway 128. The importance of the valve 126 is that fluid can enter rapidly into the bottom of cylinder 50 when the boom 74 is being raised, but the fluid will have a restricted flow only through the main passageway 128 when the boom, and hence the reel means 84 are being lowered. In practice, the control valve is placed in float position when the reel is elevated and the reel floats downwardly at a restricted and controlled rate.

In operation, the tractor 12 would be backed into position adjacent the silage 16 in a manner similar to that illustrated in FIG. 1. The three-point hitch 14 would be operated so that hopper 38 would be lowered into ground engagement as illustrated in FIG. 1. The tractor operator would then engage the PTO to permit actuation of the hydraulic cylinder 50 to cause the extension of the rod 54 therefrom to cause the boom member 44 to be moved upwardly relative to boom member 42 so that the reel means 84 is raised to the upper end of the face of the silage as seen in FIG. 1.

When the tractor operator engages the tractor PTO, the blower 20 is actuated. The hydraulic motor 82 is then operated so that the reel means 84 is rotated in a counter-clockwise direction as viewed in FIG. 1. With the reel means 84 being rotated, the reel means 84 is lowered into cutting engagement with the face of the silage 16 by causing the rod 54 to be retracted into the body 52 of hydraulic cylinder 50. The rotation of the reel means 84 causes the tines 90 to dig into the silage and to cut and remove the silage therefrom so that the silage drops downwardly into hopper 38. The silage in the hopper 38 is conveyed by auger 36 to and through the opening 30 into the blower means 20 and is blown upwardly therefrom through the spout 32 into a silage wagon, truck or the like. The shield 102 is vertically movable with a boom member 44 so that the cut silage is deflected downwardly thereby rather than being thrown towards the tractor operator.

The reel means 84 is progressively moved downwardly as the silage is cut from the silage 16 and the necessary downward force may be applied to the silage by the hydraulic cylinder 50. It can be seen that the reel means 84 cuts a vertical face in the silage 16 and thus reduces the danger of the silage collapsing onto the tractor operator. When the reel means 84 has been lowered to the position of FIG. 2, the reel means would again be raised and the tractor moved rearwardly so that additional silage may be cut.

The relatively short longitudinal length of the device of the invention greatly facilitates its turning and positioning within the relative confined area of a silage pit.

It has been determined that certain advantages result if the boom members 42 and 44 as depicted in FIG. 1 are constructed so that the upper end thereof is tilted approximately 6° towards the silage whereupon the boom and reel means 84 operate in a plane which slightly departs from the vertical. This creates a face on the cut silage which is also tilted at approximately 6°. It has been found that by so doing, there is less crumbling of the silage face. Further, the shield 102 functions more efficiently, for the cut silage has a tendency to fall to the inclined silage face below the reel means 84; thence to engage the forward face of the shield; and then the conveying system below.

As previously stated, hose 94 is of a fixed length and the relationship of the hose to the hydraulic motor 82, reel means 96 and the connection 100 is such that the need for elaborate and costly connections is eliminated. The design disclosed in FIGS. 5 and 8 eliminates the need for costly take-up reels, etc.

Thus it can be seen that the silage unloader of this invention accomplished at least all of its stated objectives.

I claim:
1. A silage unloader comprising,
a frame means including means for connection to a prime mover,
a vertically disposed telescopic boom means on said frame means, means for raising and lowering said boom means,
a silage cutting reel rotatably mounted on said telescopic boom means for rotation about a horizontal axis, said reel being vertically movable with said boom means,
means for rotating said cutting reel,
a silage conveying means on said frame means for conveying cut silage to a remote location,
means for powering said conveying means,
a silage gathering mechanism cooperating with said reel for gathering the silage cut by said reel and for supplying the silage to said conveying means.

2. The unloader of claim 1 wherein said silage cutting reel comprises a reel boom operatively connected to said boom means and extending outwardly therefrom, said means for powering said cutting reel comprising a hydraulic motor mounted on said reel boom and being operatively connected to said cutting reel for rotating the same, a first pulley rotatably mounted on the upper end of said boom means, a hydraulic hose secured to said hydraulic motor and extending upwardly therefrom around said first pulley and thence downwardly therefrom and being rigidly connected adjacent its lower end to said frame means.

3. The silage unloader of claim 1 wherein a shield means is mounted on said boom means for movement therewith for deflecting the cut silage downwardly towards said silage gathering mechanism.

4. The silage unloader of claim 3 wherein said shield means is vertically movably mounted on said boom means relative to said cutting reel.

5. The silage unloader of claim 4 wherein a stop means is provided on said boom means and said shield means for limiting the lowermost position to which said shield means may move relative to said silage gathering mechanism.

6. The unloader of claim 1 wherein said boom means has forward and rearward sides, with said cutting reel being disposed adjacent the rearward side of said boom means, the top end of said boom means being slightly tilted in a rearwardly direction to create a slight angular face in a quantity of silage being cut.

7. The unloader of claim 1 wherein a said means for raising and lowering said boom means includes a hydraulic circuit, said circuit including a restricter valve that will permit unrestricted flow of hydraulic fluid therethrough when said boom means is being extended, but which permits only a restricted rate of flow therethrough when said boom means is being lowered whereby said reel can be lowered at a relatively slower and controlled speed.

8. A silage unloader comprising,
a frame means including means for connection to a prime mover,
a vertically translatable silage cutting reel assembly mounted on said frame means including a cutting reel rotatable about a horizontal axis,
means for rotating said cutting reel,
motor means for moving said cutting reel assembly in a generally vertical plane and for exerting a positive down pressure on said cutting reel during the cutting operation,
silage conveying means on said frame means for conveying cut silage to a remote location,
means for powering said conveying means, and
a silage gathering mechanism cooperating with said reel for gathering the silage cut by said reel and for supplying the silage to said conveyor means.

9. A trench-type silo unloader comprising,
a frame means including means for connection to one end of a prime mover vehicle,
a vertically disposed boom means on said frame means,
means for raising and lowering said boom means,
a silage cutting reel rotatably mounted on said boom means for rotation about a horizontal axis,
means for rotating said cutting reel,
a silage gathering mechanism on said frame means cooperating with said reel for gathering the silage cut by said reel,
a fan-type blower means on said frame means between said boom means and the vehicle for blowing cut silage gathered by the gathering mechanism to a remote location, and
means for powering said blower means from the vehicle.

10. A silage unloader comprising,
a frame means including means for connection to a prime mover,
a boom means on said frame means,
means for raising and lowering said boom means,
a silage cutting reel rotatably mounted on said boom means for rotation about a horizontal axis, said reel being vertically movable with said boom means,
means for rotating said cutting reel,
a conveying means on said frame means for conveying cut silage to a remote location,
means for powering said conveying means,
a silage gathering mechanism cooperating with said reel for gathering the silage cut by said reel and for supplying the silage to said conveying means,
a shield disposed between said cutting reel and said boom means for vertical movement with said reel, and
means for vertically moving said reel independent of said shield.

11. A silage unloader comprising,
a frame means including means for connection to a prime mover,
a vertically disposed telescopic boom means on said frame means,
a silage cutting reel rotatably mounted on said telescopic boom means for rotation about a horizontal axis, said reel being vertically movable relative to said boom means, and
power means for vertically moving said boom means and simultaneously vertically moving said reel relative to said boom means.

* * * * *